United States Patent [19]

Hom et al.

[11] Patent Number: 4,801,070

[45] Date of Patent: Jan. 31, 1989

[54] ENGINE DUCT AND CASE CONSTRUCTION

[75] Inventors: Felix Hom, La Mesa; Uwe Bockenhauer, Bonita; James R. Woodward, La Jolla, all of Calif.

[73] Assignee: Rohr Industries, Inc., Chula Vista, Calif.

[21] Appl. No.: 48,239

[22] Filed: May 11, 1987

[51] Int. Cl.$^4$ .............................................. B23K 31/02

[52] U.S. Cl. .................................... 228/184; 228/194; 228/195; 228/152; 228/161

[58] Field of Search ............... 228/152, 184, 185, 170, 228/161, 193, 194, 195, 265

[56] References Cited

U.S. PATENT DOCUMENTS

| | | | |
|---|---|---|---|
| 3,996,019 | 12/1976 | Cogan | 228/193 X |
| 4,245,769 | 1/1981 | Meginnis | 228/193 X |
| 4,429,824 | 2/1984 | Woodward | 228/195 X |
| 4,522,859 | 6/1985 | Blair | 228/194 X |

FOREIGN PATENT DOCUMENTS

| | | | |
|---|---|---|---|
| 159989 | 9/1983 | Japan | 228/184 |

*Primary Examiner*—Fred A. Silverberg
*Assistant Examiner*—Carmine Cuda
*Attorney, Agent, or Firm*—Patrick J. Schlesinger; Frank D. Gilliam

[57] ABSTRACT

A method of producing a reinforced duct structure for use with turbo-fan aircraft engines and the like. The duct is first cut from a flat metal sheet in a predetermined pattern. The sheet is rolled to form a tubular or conic structure of the approximate desired configuration and welded along the open seam. The welded tubular structure is then expanded to the exact required shape. The expanded tubular structure is cut out in selected areas to form a tubular grid structure. A tubular liner conforming to the inner surface of the tubular grid structure is installed and bonded to the grid structure forming an integral tubular structure of the desired configuration and strength and; attachment of any required mating flanges and structure bosses to the integral tubular structure.

17 Claims, 1 Drawing Sheet

20

16

18

22

22

ENGINE DUCT AND CASE CONSTRUCTION

BACKGROUND OF THE INVENTION

1. Field of the Invention

This invention is directed to a method for manufacturing ducts which require at least one smooth surface and load bearing stringers or the like and more particularly to an inexpensive method for forming such ducts for aircraft engine purposes.

2. Description of the Prior Art

For years, ducts of this type have been made from sheet and stringers, honeycomb sandwich and chem-milled structures.

In the sheet and stringer types, a sheet metal shell forms the shape of the duct and the sheet metal is then stiffened by load bearing stringers which are riveted or brazed to the sheet metal shell.

In the honeycomb sandwich core reinforced duct structures, honeycomb core stabilizes the thin sheet metal facings by sandwiching it between smooth inner and outer metal liners which form the duct and carry the loads required thereof.

More recently, ducts have been constructed by chem milling a formed structure so that ribs are formed and exposed in an isogrid pattern and the ribs are made very thin for weight reduction. The ribs in this structure, like the stringers of the first mentioned structure, carry the required loads while the thin web metal sheet areas establish the shape and contain the relatively low pressure gas path.

In nearly all methods of manufacture with the exception of the more expensive honeycomb sandwich structures, ducts of this type derive their strength capability through the stringers, ribs or bead configurations The shell or sheet metal part of the structure serves mainly to form the duct configuration and confine the desired gas path.

SUMMARY OF THE INVENTION

This invention is directed to a lower cost and more efficient manufacturing method for producing engine ducts and cases and ducts and cases for other similar applications.

The method of manufacturing of the ducts of the instant invention requires several manufacturing steps.

The first step is to cut flat metal plate in the pattern required to form the duct. The cutting can be accomplished by any known means. The abrasive water jet method (AWJ) or LASER method of cutting the flat pattern have been found to be highly successful in that the finished cut edges require very little finishing and the cut is very accurate. These cutting systems are generally controlled by CAD/CAM for extreme precision.

The second step is to roll the flat metal pattern into a tubular form having a close but not exact configuration of the final duct. The opening formed by the abutting edges of the flat metal pattern when roll formed into the tubular duct configuration are welded together forming a seam and making an integral tubular structure.

The third step is to expand and shape the integral tubular structure into the exact configuration required for the final duct configuration. For engine ducts and cases titanium or titanium alloys are generally employed which can be heated and formed into the desired configurations. Other metals can be expanded and formed by methods known for the particular type of metal.

The fourth step is to cut out sections of the sized tubular structure to form a structure with an open rib pattern remaining which is configured to accommodate the required loads to be encountered by the finished duct. By using CAD/CAM, the desired pattern is automatically cut from the sized tubular structure. The cutting can be accomplished by AWJ, LASER or the like. AWJ and LASER are preferred as the rib and boss insert pattern can be precisely established without additional operations.

The fifth step is to establish the gas path by inserting a thin tubular inner shell within the rib and boss pattern of the sized tubular structure and bonding the inner shell to the sized tubular structure. The bonding together can be accomplished by any known method suitable for the purpose intended. Liquid interface diffusion bonding (LID) or solid state diffusion bonding (DB) is preferable when the structure is formed of titanium or titanium alloys. LID bonding is fully explained in U.S. Pat. Nos. 3,957,194; 4,429,824 and others.

The sixth and final step is to attach end flanges and attachment of the bosses to the final duct configuration.

Steps one and four can be combined prior to step two. The flat pattern is laid out as explained and the flat pattern is then cut to form the ribs and bosses. The layout of the rib and boss pattern when cutting is accomplished prior to rolling may be different to provide the required pattern after the forming of the tubular structure to its final size.

Step six can be accomplished after step four and before step five as required.

The ribs can be undercut in the form of "I" beams or the like to further reduce weight and yet maintain the required loads. This can be accomplished at any convenient stage of the manufacturing of the duct.

An object of the present invention is to advance the present state of the art duct manufacturing which is lighter in weight for given load requirements.

Another object of the present invention is to produce a low weight duct at a lower economic cost.

These and other objects and advantages of the invention will be better understood by reference to the following detailed description, when considered with the drawings, in which:

DETAILED DESCRIPTION OF THE INVENTION

For ease of explanation and not by way of limitation, the following discussion is directed to the manufacture of an engine duct for a turbo fan engine. It should be understood that ducts and cases for other uses could be manufactured with equal success by the same method.

Figure 1:
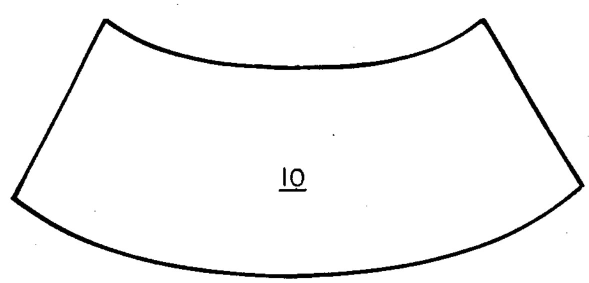
FIG. 1 is a plan view showing of a section of flat metal cut to a net size to form the rib and boss sections of the duct.

Referring now to FIG. 1, a flat pattern cutout 10 is shown which is sized to produce the end product. The metal for engine ducts is generally titanium or a titanium alloy well known in the art. The metal is generally from 3/16 to 5/16 inches thick. An ideal thickness is substantially ¼ inch. The pattern is cut from flat stock by any convenient means. Abrasive water jet (AWJ) or LASER are preferred methods as a finished product results requiring only minimal if any additional preparation.

Figure 2:
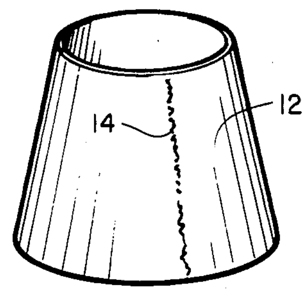
FIG. 2 is a perspective showing of the metal pattern of FIG. 1 rolled to a tubular form welded at the abutting edges.

Referring now to FIG. 2, the flat pattern 10 of FIG. 1 is then rolled to form a tubular shaped structure 12. A seam 14 is formed by bonding together the two outer ends of the flat pattern by suitable means, such as welding, brazing or the like. An integral tubular structure is now formed roughly resembling the final duct structure.

Figure 3:
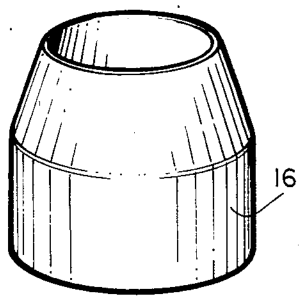
FIG. 3 is a perspective showing of FIG. 2 expanded and formed to the rib and boss section size required for the duct.

Referring now to FIG. 3, the integral tubular duct structure 12 is then expanded and reshaped into the tubular structure 16 which has the dimensional requirements of the finished duct. The expanding is preferably performed by use of heat and Delta-Alpha tooling well known in the titanium or titanium alloy forming art. Other suitable means for expanding may be employed. Details of the preferable Delta-Alpha tooling method can be found in U.S. Pat. No. 4,429,824 hereinbefore noted.

Figure 4:
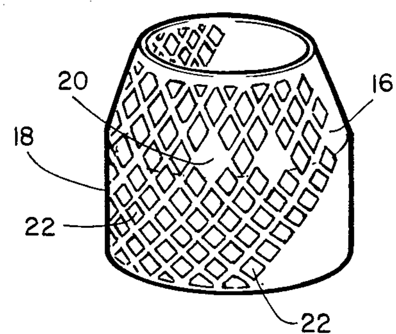
FIG. 4 is a perspective showing of the expanded structure of FIG. 3 cut to form ribs and bosses.

Referring now to FIG. 4, cutouts are made in the tubular structure 16 at selected locations to form ribs 18 and bosses 20 in a pattern designed to support the anticipated loads to be encountered and attachment locations for accessories and attachment structure provided as required. The grid and rib pattern provides load and stress support at predetermined locations in the final duct product. The openings 22 between the ribs and bosses lighten the overall weight of the structure.

Figure 5:
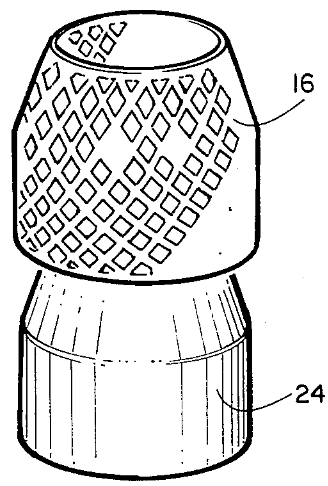
FIG. 5 is a perspective showing of the rib and boss section of FIG. 4 with a liner being inserted therein to form the gas passage.

Referring now to FIG. 5, the grid structure 16 is now mated with an inner shell 24 formed in the same manner as the integrated tubular structure of FIG. 3 discussed above. The thickness of the inner shell 24 is typically 0.010 to 0.020 inches. Ideally, substantially 0.016 inch is desired. The inner shell 24 is inserted into the isogrid structure 16 and bonded thereto by suitable means. Preferred methods of bonding the inner shell to the grid structure is LID or solid state diffusion bonding using Delta-Alpha tooling as disclosed in U.S. Pat. Nos. 3,747,197; 3,981,429; 3,957,194; 3,768,985; 3,769,101; 4,059,217; 4,429,824 and others known in this art. Methods of solid state diffusion bonding are well known in the art.

Figure 6:
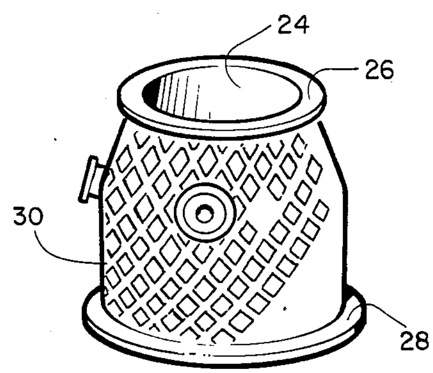
FIG. 6 is a perspective showing of a final duct assembly

Referring now to FIG. 6, the assembled inner shell 24 and grid structure 16 form a complete duct except for any required connector flanges shown in this Figure as elements 26 and 28. These flanges or like flanges are attached to the ends of the completed duct structure 30 by any convenient means including election beam (EB) welding, LID bonding, state diffusion bonding, welding, brazing or the like suitable for the purpose intended. The preferred bonding means is EB welding well known in the art.

Figure 7:
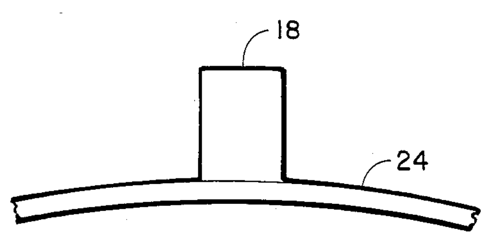
FIG. 7 is a cutaway showing taken along line 7—7 of FIG. 6.

It should be understood that the flat pattern of FIG. 1 could be cut to form the grid pattern of FIG. 4 prior to the steps shown in FIG. 2. Also, the flanges 26 and 28 could be bonded to the duct during the bonding of the inner shell to the isogrid structure (see FIG. 7.)

Figure 8:
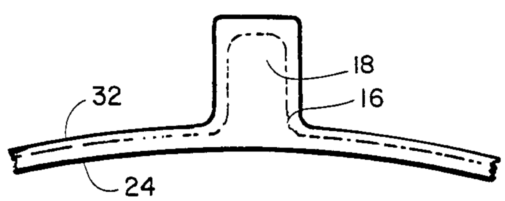
FIG. 8 is a showing similar to FIG. 7 showing both an inner and outer duct

Although the example discussed throughout this disclosure included an inner shell 26 it should be understood that an outer shell could be bonded to the outer surface of the grid structure in a like manner or both an inner shell 26 and the outer shell 32 could be employed (see FIG. 8.)

Figure 9:
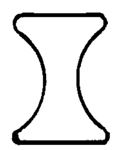
FIG. 9 is a cross-sectional showing of an "I" beam rib configuration.

There is an additional feature that can be added to the rib cage concept. For example, the rectangular metal ribs can be made into lighter weight "I" beam configuration as shown in FIG. 9. Here the AWJ cut rib is dip masked to cover all surfaces. Laser trimming can be CNC programmed to exposed the rib centerline, and by subsequent chem-milling, a natural "I" beam is generated.

Although the foregoing invention has been described in some detail by way of illustration and example for purposes of clarity and understanding, it should be understood that certain changes and modifications may be practiced within the spirit of the invention as limited only by the scope of the appended claims.

What is claimed as new and useful and desired to be secured by United States Letters Patent is:

1. Method of manufacturing force supporting and gas directing ducts, and cases comprising the steps of:
- (a) cutting a pattern of the desired configuration from a flat sheet of duct supporting material;
- (b) rolling said flat sheet of duct supporting material into a tubular structure with the two adjacent ends abutting;
- (c) bonding together said two ends;
- (d) shaping the tubular structure to the required shape;
- (e) removing selected portions of the tubular structure in a preselected pattern of ribs and bosses; and
- (f) bonding a thin sheet metal gas directing liner to the inner surface of said ribs and bosses.

2. The method as defined in claim 1 further comprising the step of bonding attachment flanges to the open ends of duct.

3. The method as defined in claim 1 wherein said cutting is performed by an abrasive water jet.

4. The method as defined in claim 1 wherein said cutting is performed by laser means.

5. The method of claim 1 wherein said shaping of said tubular structure is by heat and Delta-Alpha tooling.

6. The method of claim 1 wherein said removing selected portions of said tubular structure is accomplished by an abrasive water jet.

7. The method of claim 1 wherein said removing selected portions of said tubular structure is accomplished by laser means.

8. The method of claim 1 wherein said bonding of a thin sheet gas directing liner to the inner surface of said ribs and bosses is by Liquid Interface Diffusion bonding.

9. The method of claim 1 wherein said bonding of a thin sheet gas directing comes to the liner surface of said ribs and bosses is by Solid State Diffusion Bonding.

10. The method of claim 1 additionally comprising the step of bonding a thin sheet metal liner to the outer surface of said ribs and bosses.

11. Method of manufacturing force supporting and gas directing ducts comprising the steps of:

(a) cutting a pattern of a desired configuration from a flat sheet of duct supporting material;

(b) removing selected areas of said flat sheet of duct supporting material in a preselected pattern of ribs and bosses;

(c) rolling said flat sheet of duct supporting material into a tubular structure with the two adjacent ends abutting;

(d) bonding together said two ends;

(e) shaping the tubular structure to the desired shape;

(f) bonding a thin sheet metal gas directing liner to the inner surfaces of said ribs and bosses.

12. The method as defined in claim 11 wherein step (f) further includes the step of bonding attachment s to the open ends of said duct.

13. The method as defined in claim 11 wherein said cutting is by an abrasive water jet.

14. The method as defined in claim 11 wherein said cutting is by laser means.

15. The method of claim 11 wherein said shaping of said tubular structure is by heat and Delta-Alpha tooling.

16. The method of claim 11 including the additional step of bonding a liner to the outer surfaces of said ribs and bosses.

17. The method of claim 11 including the additional step of configuring said ribs to form substantially an "I" beam cross section.

* * * * *